United States Patent
Elwell et al.

(10) Patent No.: US 9,621,353 B2
(45) Date of Patent: *Apr. 11, 2017

(54) METHOD FOR AUTHENTICATING KEY INFORMATION BETWEEN TERMINALS OF A COMMUNICATION LINK

(71) Applicant: Unify GmbH & Co. KG, Munich (DE)

(72) Inventors: John Elwell, Nottingham (GB); Kai Fischer, Baldham (DE)

(73) Assignee: Unify GmbH & Co. KG, Munich (DE)

( * ) Notice: Subject to any disclaimer, the term of this patent is extended or adjusted under 35 U.S.C. 154(b) by 19 days.

This patent is subject to a terminal disclaimer.

(21) Appl. No.: 14/252,061

(22) Filed: Apr. 14, 2014

(65) Prior Publication Data

US 2014/0223187 A1 Aug. 7, 2014

Related U.S. Application Data

(63) Continuation of application No. 12/810,896, filed as application No. PCT/EP2008/000054 on Jan. 7, 2008, now Pat. No. 8,745,400.

(51) Int. Cl.
*H04L 9/32* (2006.01)
*H04L 29/06* (2006.01)

(52) U.S. Cl.
CPC ........ *H04L 9/3247* (2013.01); *H04L 63/0823* (2013.01); *H04L 63/123* (2013.01); *H04L 63/061* (2013.01); *H04L 65/1006* (2013.01)

(58) Field of Classification Search
CPC . H04L 63/061; H04L 63/0823; H04L 63/123; H04L 65/1006; H04L 9/3247; H04L 63/0428; H04L 63/126; H04L 63/164

(Continued)

(56) References Cited

U.S. PATENT DOCUMENTS 6,912,655 B1 * 6/2005 Zucker ............... H04L 9/065
                                                          380/277
7,822,186 B1    10/2010 Boni
(Continued)

FOREIGN PATENT DOCUMENTS

CN    1677978 A     10/2005
WO    2006126202 A2  11/2006

OTHER PUBLICATIONS

International Search Report for PCT/EP2008/000054 dated Oct. 7, 2008.

(Continued)

*Primary Examiner* — Gary Gracia
(74) *Attorney, Agent, or Firm* — Buchanan Ingersoll & Rooney PC

(57) ABSTRACT

With the help of a key management protocol, the transmitted key information is authenticated by at least one certificate signed by the terminals, and at least one fingerprint of the public keys or certificate, which were used for authenticating the key information, is added to the useful part of an SIP message. The identity information present in the header of an SIP message is additionally copied into a region of the header or the useful part, and a signature is produced by way of the fingerprint, the datum information presented in the header of an SIP message, the copied identity information, and optionally the certificate reference information, and is inserted into a further region of the header of the SIP message. The additional signature that is produced and inserted can remain uninfluenced during a transmission across several networks of different network operators.

20 Claims, 1 Drawing Sheet

(58) Field of Classification Search
USPC ...... 713/176, 157, 170, 193; 370/389; 726/2
See application file for complete search history.

(56) References Cited

U.S. PATENT DOCUMENTS

| | | | | |
|---|---|---|---|---|
| 7,845,000 | B2* | 11/2010 | Viger | G06F 17/30206 726/3 |
| 7,984,479 | B2* | 7/2011 | Brabson | G06F 21/33 713/155 |
| 8,024,560 | B1* | 9/2011 | Alten | 713/156 |
| 8,085,937 | B1* | 12/2011 | Bradley, II | H04L 9/0825 380/259 |
| 2003/0126230 | A1* | 7/2003 | Donatelli | H04L 29/06 709/217 |
| 2003/0217165 | A1* | 11/2003 | Buch | H04L 29/06027 709/229 |
| 2003/0221104 | A1* | 11/2003 | Baessler | H04L 63/062 713/175 |
| 2004/0139230 | A1* | 7/2004 | Kim | H04L 29/06027 709/245 |
| 2004/0172536 | A1 | 9/2004 | Malville et al. | |
| 2005/0080907 | A1* | 4/2005 | Panasyuk | H04L 12/4633 709/228 |
| 2005/0091379 | A1* | 4/2005 | Kim | H04L 29/06027 709/227 |
| 2005/0220095 | A1* | 10/2005 | Narayanan | H04L 63/126 370/389 |
| 2005/0265327 | A1* | 12/2005 | Buch | H04L 63/10 370/389 |
| 2006/0165060 | A1 | 7/2006 | Dua | |
| 2006/0185007 | A1* | 8/2006 | Hourselt | H04L 63/0428 726/10 |
| 2006/0265590 | A1 | 11/2006 | DeYoung et al. | |
| 2007/0019622 | A1* | 1/2007 | Alt et al. | 370/352 |
| 2007/0071001 | A1 | 3/2007 | Mitreuter et al. | |
| 2007/0268904 | A1 | 11/2007 | Van Bemmel | |
| 2007/0276951 | A1* | 11/2007 | Riggs | H04L 63/0428 709/229 |
| 2007/0288754 | A1 | 12/2007 | Kaji et al. | |
| 2008/0022383 | A1 | 1/2008 | Bobde et al. | |
| 2008/0037447 | A1* | 2/2008 | Garg | H04L 29/06027 370/260 |
| 2008/0046745 | A1 | 2/2008 | Buch et al. | |
| 2008/0133414 | A1* | 6/2008 | Qin | G06F 21/10 705/50 |
| 2008/0133761 | A1* | 6/2008 | Polk | H04L 63/0428 709/228 |
| 2008/0181401 | A1 | 7/2008 | Picquenot et al. | |
| 2008/0198861 | A1* | 8/2008 | Makela | H04W 12/06 370/401 |
| 2008/0263629 | A1* | 10/2008 | Anderson | H04L 9/0894 726/2 |
| 2009/0006533 | A1* | 1/2009 | Guo | H04L 65/1046 709/203 |
| 2009/0006844 | A1* | 1/2009 | Wing | H04L 63/126 713/156 |
| 2009/0016339 | A1 | 1/2009 | Tanizawa et al. | |
| 2009/0190576 | A1* | 7/2009 | I'Anson | H04L 63/14 370/352 |
| 2010/0138660 | A1 | 6/2010 | Haynes et al. | |

OTHER PUBLICATIONS

Written Opinion of the International Searching Authority for PCT/EP2008/000054 dated Oct. 7, 2008.

Fischl et al. "Framework for Establishing an SRTP Security Context using DTLS draft-ietf-sip-dtls-srtp-framework-00.txt", IETF Standard-Working-Draft, Internet Engineering Task Force, IETF, CH. vol. sip, Nov. 12, 2007, XP015053888, ISSN: 0000-0004.

Peterson et al. "Enhancements for Authenticated Identity Management in the Session Initiation Protocol (SIP)"; IETF Standard, Internet Engineering Task Force, IETF, CH. Aug. 1, 2006, XP015054984 ISSN: 0000-0003.

International Preliminary Report on Patentability for PCT/EP2008/000054 (German).

International Preliminary Report on Patentability for PCT/EP2008/000054 (English).

* cited by examiner

METHOD FOR AUTHENTICATING KEY INFORMATION BETWEEN TERMINALS OF A COMMUNICATION LINK

CROSS-REFERENCE TO RELATED APPLICATIONS

This application is a continuation of U.S. patent application Ser. No. 12/810,896, which is the United States national phase under 35 U.S.C. §371 of PCT International Patent Application No. PCT/EP2008/000054, filed on Jan. 7, 2008, and incorporated by reference herein.

BACKGROUND OF THE INVENTION

Field of the Invention

Embodiments of the invention relate methods and devices for ensuring the security of a fingerprint related to a certificate, even when it is transmitted through multiple networks with different network operators.

Background of the Art

In communication networks, in particular Voice over IP communication networks, a communication link or connection is often controlled by the SIP (Session Internet Protocol). For transferring data streams or multimedia data streams, i.e., user information or video and/or speech information, the RTP (Real-Time Protocol) is used. The RTP is defined in RFC standard 1889 and since 2003 in RFC standard 3550. Due to increased security requirements, data streams have long been transmitted in encoded form, and the secured RTP (SRTP) used for this is described in RFC standard 3711. The SRTP requires common private keys that are exchanged with an appropriate protocol and such protocols are known in the industry as key management protocols.

A well-known key management protocol is the MIKEY protocol, which is defined in RFC standard RFC 3830 and is embedded in the signaling protocol SIP.

Another key management protocol is the DTLS-SRTP (Data Transport Layer Security-Secure Transport Protocol). The DTLS protocol is based on the TLS (Transport Layer Security) protocol and is an encoding protocol for data transfers over the Internet. The DTLS protocol can also be substituted for less reliable protocols such as the UDP (User Datagram Protocol). The DTLS-SRTP is applied within user data channels or media data channels, and the key exchange is authenticated by certificates and the associated private keys. Rather than being signed by a trusted PKI (Public Key Infrastructure) authority, the certificates are signed by each terminal point or device itself. Certificates of this type are not adequate for authenticating terminals covered by the key management protocol, because there is no trust relationship with a common security anchor. To ensure authentication by the device with which a communication connection is planned, one or more pieces of security information, known in the industry as fingerprints, is or are generated and transmitted within the SIP message. Each fingerprint is related to a particular public key or to a certificate and usually represents the hash value of a hash function applied to the public key or certificate. The hash value is a short numerical sequence that is separate from the public key or certificate but clearly identifies the public key. The fingerprint is secured within the SIP message by a signature—according to RFC standard 4474, for example—which is generally used to secure the header and the SIP body, such that the SIP body represents the user data portion of an SIP message in which the information to be transmitted for user and media data is transferred.

For an SIP message, in particular an INVITE message, the key information carried in a media channel is authenticated, using a key management protocol, by at least one certificate signed by the terminals, and in the body of an SIP message, at least one fingerprint of the certificate is inserted for authenticating the key information to be transmitted. In the header of an SIP message, according to the SIP, a piece of date information, a piece of certificate reference information, and a piece of identify information for the terminal generating the SIP message are inserted.

The quality of the end-to-end security of user and media data depends upon the authentication of the fingerprint. If SIP messages are transmitted over networks with multiple carriers or network operators, the contents of SIP messages are changed; an example is the changes made to transport addresses in each network operator's session board controllers. In such cases, the SIP identity signature as described in RFC standard 4474 is no longer valid and must be regenerated by each network operator. This opens up the possibility for an attack on the authenticity of the fingerprint, in which the certificate's fingerprint is replaced in the intervening network operators' switching networks by a fingerprint for a certificate that is assigned to the network operator's intervening switching network.

BRIEF SUMMARY OF THE INVENTION

The most significant aspect of embodiments of the invention is that a key management protocol is used to authenticate the transmitted key information by means of certificates signed by the terminals, and at least one fingerprint of a certificate signed by a terminal is inserted in the body of an SIP message. In the header of an SIP message, a piece of date information, a piece of certificate reference information, and a piece of identify information for the terminal generating the SIP message are inserted. According to an embodiment of the invention, the identity information in one area of the header or body is copied, and a signature for the fingerprint, the date information, and the copied identity is generated and inserted into a different area of the header of an SIP message. As an option, the certificate reference information can be included when the signature is generated.

An important advantage of embodiments of the invented method is that, for a communication connection between two terminal points or devices that goes through multiple networks with multiple network operators, even if a change is made to the identity signature by the different network operators' networks, the additional signature generated and inserted according to the invention remains unaffected and can be used for clear authentication of the transmitted key information. This clear authentication of the key information is possible even if the identity information is changed in the different operators' networks. The invented method can therefore prevent attacks on authentication security in different network operators' networks.

According to one advantageous embodiment of the invented method, at least one additional piece of information related to authentication is inserted in the SIP message when the signature is generated. This makes it possible to include information that even further increases security.

According to another embodiment of the invented method, the DTLS-SRTP (Data Transport Layer Security-Secure Transport Protocol) is used as the key management protocol. This protocol is recommended especially for securing multimedia traffic transmitted according to the SIP.

According to another advantageous embodiment of the invented method, the identity information, date information, and certificate reference information is inserted in predefined fields of the SIP message header, the fingerprint is inserted in a predefined field of the SIP message body, and at least the parts of the predefined fields that contain these pieces of information are included when the signature is generated. This means that the information in each of the predetermined fields must not completely fill the field, and when the signature is generated, either only the information contained in the fields or the complete field is included.

Additional advantageous embodiments of the invented method and one arrangement for an analysis unit according to the invention are described in later claims.

BRIEF DESCRIPTION OF THE FIGURES

The invented method is further explained below, with reference to two drawings which show.

DETAILED DESCRIPTION OF THE INVENTION

Figure 1:
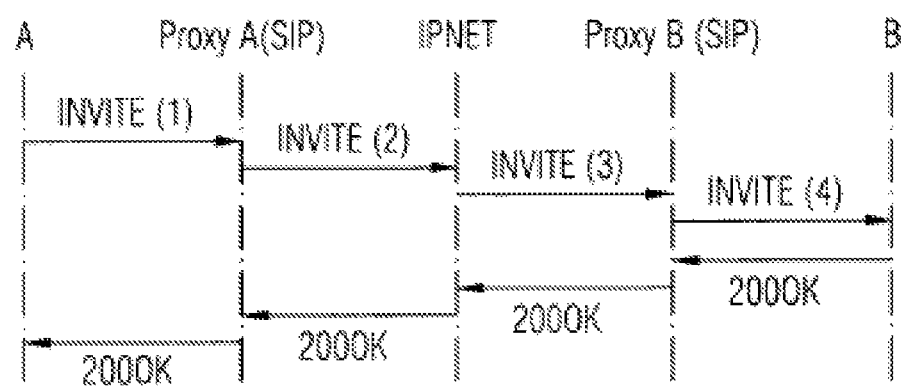
FIG. 1 a flow diagram for explaining the invented method.

FIG. 1 is a flow diagram showing how a communication connection between a terminal A and a terminal B—designated as A and B in FIG. 1—is generated. After each of the two terminals A, B, in the direction of the network IPNET, there is a respective proxy A and proxy B, which consist of SIP proxies in the execution example and are designated as proxy A (SIP) and proxy B (SIP) in FIG. 1. Between proxy A and proxy B, for this execution example, there is assumed to be at least one network IPNET with a network operator, such as the Internet and an Internet operator. Each of the terminals A, B, as well as proxy A and proxy B and the network IPNET, are represented by a vertical dashed line in the flow diagram.

An SIP proxy is usually generated in an SIP proxy server and is responsible for converting a name into an IP address in an SIP domain and vice versa. Additional services, performance features, and scalability to SIP networks are also accomplished in an SIP proxy server. An SIP domain is indicated by the domain designation in a URI (Universal Resource Identifier), and the SIP proxy for that domain—domains A and B in the execution example—handles the address change.

A terminal A, B or an SIP terminal can consist of an SIP terminal device, a gateway, or a supplemental service server such as a conference server, using the SIP as the VoIP.

For the execution example, it is assumed that within the framework of the SIP for transmitting the voice or multimedia information, the SRTP is used as the secured RTP under which the key or key information is exchanged with a key management protocol. It is further assumed that the DTLS-SRTP (Data Transport Layer Security-Secure Transport Protocol) is used as the key management protocol. The DTLS protocol is based on the TLS (Transport Layer Security) protocol and is an encoding protocol for data transfers over networks with Internet protocol. The DTLS-SRTP is used within the user data channel or media data channel such that the key exchange is authenticated through certificates and the associated private keys. Rather than being signed by a trusted PKI (Public Key Infrastructure) authority, the certificates are signed by each terminal A, B or terminal device itself. To ensure authentication by the device with which a communication connection is planned, one or more pieces of security information, known in the industry as fingerprints fp, is or are generated and sent within the SIP message. Each fingerprint fp is related to a particular public key or to a certificate and usually represents the hash value of a hash function applied to the public key or certificate. The hash value is a short numerical sequence that is separate from the public key but clearly identifies the public key. The fingerprint fp is secured within the SIP message by a signature—according to RFC standard 4474, for example—which is generally used to secure the header and the SIP body. The signature guarantees that the key information is from the original signature issuer.

Figure 2:
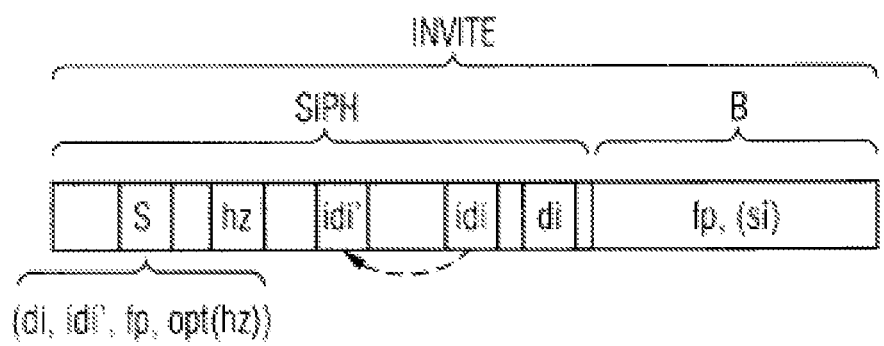
FIG. 2 the configuration of the SIP messages indicated in FIG. 1.

When a communication connection is established with an SIP proxy according to the SIP, an INVITE message INVITE (1) is sent from terminal A to the proxy A that is assigned to SIP domain A. FIG. 2 shows the configuration of an INVITE message INVITE (2) sent between proxy A and the network IPNET, wherein only the portions or fields of the INVITE message INVITE that are required in order to explain the invented method, including the information they contain, are described.

An INVITE message INVITE (1) contains an SIP header SIPH and a body B, and one or more fingerprints fp derived from public keys or certificates of the terminal—designated in FIG. 2 as fp (si)—and inserted by terminal A in an SDP (Session Description Protocol) field are transmitted in the body B and used to authenticate the key information si. The parameters of a communication connection are generally transmitted in the SDP fields. A piece of identification information idi and a piece of date information di—designated as idi, di in FIG. 2—are entered in the SIP header SIPH, with the identity information idi entered in a special field—known as the From Header in the industry—and the date information di entered in a date field. Here the fingerprint fp represents the certificate of terminal A, used to authenticate the key information si.

The identity information idi contained in the SIP header of the SIP message INVITE (2) is copied by proxy A, and the copy idi' is inserted in an additional field or element of the SIP header SIPH. This copying and inserting of the identity information idi can alternatively be performed by terminal A. In addition, a piece of reference information hz for a domain certificate is entered through proxy A in a certificate field, whereby the reference information hz indicates a network address—in particular an Internet address—at which the certificate from domain A is stored or can be called up. A domain certificate represents a signed public piece of key information used to verify a transmitted signature sent with a private piece of key information.

In order to achieve unique authentication of the key information si by a user or by proxy B or terminal B, a signature S is generated according to the invention for the date information di, the copied identity information idi', the fingerprint fp contained in the body B, and optionally the reference information hz, and that signature is inserted in an additional field of the SIP header SIPH, designated in FIG. 2 as di, idi', fp, opt(hz)>S. The signature S is generated using a piece of signature information managed by proxy A or B or a piece of private key information and a hash value derived from the date information di, the copied identity information idi', the reference information hz, and the fingerprint fp contained in the body B. The resulting generated INVITE message INVITE (2) can also, as shown in FIG. 1, be transmitted over one or more networks IPNET with the IP to proxy B and terminal B, designated in FIG. 1 as INVITE (3), INVITE (4).

One example is taken from a header SIPH in an INVITE message INVITE according to the SIP, which is sent by proxy A over the network IPNET to terminal B:

```
INVITE sip:b@domainb.com SIP/2.0                             1)
Via: SIP/2.0/TLS pc.domaina.com;branch= zEz67in32Wer4i       2)
To: B <sip:b@domainb.com>                                    3)
From: A <sip:a@domaina.com>;tag=1234567890                   4)
Call-ID: 12345678901234                                      5)
CSeq: 987654 INVITE                                          6)
Max-Forwards: 50                                             7)
Date: Thu, 03 Jan 2008 15:07:00 GMT                          8)
Contact: <sip:a@pc.domaina.com>                              9)
Content-Type: application/sdp
       10)
Content-Length: 123
       11)
DomainCert-Info: <https://domaina.com/proxya.cer>;          12)
            alg=rsa-sha1
Original-Identity-Info: A <sip:a@domaina.com>
       13)
Signature:  "jjsRdiOPQZYOy2wrVghuhcsMbHWUSFxI+
            p6q5TOQXHMmz
            14)
            6uEo3svJsSH49th8qcefQBbHC00VMZr2k+t6VmCvPonWJM
            GvQTBDqghoWeLxJfzB2alpxAr3VgrB0SsjcdVcunyaZucy
            RlB YQTLqWzJ+KVhPKbfU/pryhVn9Jcqe="
```

Explanation:
1) Message type, target address (URI), SIP version
2) IP address, port number, and transport protocol for the message's answerback
3) Display name of B and its URI
4) Display name of A and its URI (identification information idi)
5) Random string as the unique number for a communication connection
6) Sequential number (related to the message type)
7) Maximum number of proxy servers (decreased as each proxy is passed)
8) Date information di
9) SIP address of the recipient for a direct communication
10) Data type in body B (according to the SDP, for example)
11) Length of the body
12) Reference information hz for domain certificate
13) Copied identification information idi'
14) Signature S Another example is taken from an SIP body B:

```
v=0
    15)
o=- 6418913922105372816 2105372818 IN IP4 192.0.2.1
    15)
s=example2
    15)
c=IN IP4 192.0.2.1
    15)
t=0 0
    16)
m=audio 54113 RTP/SAVP 0
    17)
a=fingerprint:SHA-1
18)
4A:AD:B9:B1:3F:82:18:3B:54:02:12:DF:3E:5D:49:6B:19:E5:7C:AB
m=video 54115 RTP/SAVP 0
a=fingerprint:SHA-1
4A:AD:B9:B1:3F:82:18:3B:54:02:12:DF: 3E:5D:49:6B:19:E5:7C:AB
```

Explanation:
15) RTP (Real Time Protocol)-Session-Parameter
16) Time description
17) Media type (such as audio)
18) Fingerprint This allows network-specific signatures for the INVITE message INVITE to be generated by the networks carrying the INVITE message INVITE and inserted in the INVITE message INVITE, without changing or affecting the signature S inserted in the SIP header SIPH. This means that in proxy B, by testing the signature S contained in the additional field, the key information si sent in a media channel can be uniquely authenticated, i.e., the fingerprint fp is uniquely inserted by proxy A or domain A. Terminal B can also read the identity information idi and the copied identity information idi' from the received INVITE message INVITE (4) and can notify a user of terminal B.

According to the SIP, an answering message 200OK is generated in terminal A and sent through proxy B, the network IPNET, and proxy A to terminal A. It is no longer necessary to generate and insert the signature S in the answering message 200OK, because terminal A and the key information si are identified or authenticated by the unique identity information idi and the copied identity information idi'.

According to the invented method, the key information for terminal B is authenticated in terminal A or proxy A in the same way as is described above, but instead of an INVITE message INVITE, an UPDATE message is used (not shown in FIG. 1).

What is claimed is:

1. A method for authenticating a piece of key information between a first terminal and a second terminal that are configured to communicate via at least one network comprising:

the first terminal creating a first message, the first message having a header and a body, the body having at least one fingerprint derived from at least one certificate of the first terminal that authenticates the at least one certificate, the header comprising a piece of identification information that identifies the first terminal and a piece of date information;

the first terminal copying the piece of identification information and inserts the copied piece of identification information into an additional field or element of the header of the first message;

the first terminal sending the first message to a first proxy assigned to the first terminal in a first domain;

the first proxy receiving the first message and inserting a piece of reference information for the at least one certificate in the first message, the reference information identifying an address at which the at least one certificate is stored or is callable;

the first proxy generating a signature based on a hash value derived from the date information, signature information managed by the first proxy, the copied piece of identification information, and the at least one fingerprint;

the first proxy including the generated signature within the header of the first message having the inserted piece of reference information for the at least one certificate to form a second message;

the first proxy sending the second message to a second proxy assigned to the second terminal in a second domain.

2. The method of claim 1, wherein the signature is also based on the reference information.

3. The method of claim 1, comprising including at least one additional piece of authentication-related information in the first message when generating the signature.

4. The method of claim 1, further comprising:
the second terminal receiving the second message;
the second terminal responding to the second message by sending a third message, the third message being an UPDATE message in accordance with Session Initiation Protocol (SIP).

5. The method of claim 1, further comprising:
the second terminal receiving the second message;
in response to the received second message, the second terminal creating a third message, the third message having a body and a header, the body of the third message having at least one fingerprint derived from at least one certificate of the second terminal that authenticates that at least one certificate of the second terminal, the header of the third message comprising a piece of identification information that identifies the second terminal and a piece of date information;
one of the second terminal and the second proxy copying the piece of identification information of the third message and inserting the copied piece of identification information of the third message into the third message;
the second proxy receiving the third message and inserting a piece of reference information for the at least one certificate of the second terminal, the reference information of the third message identifying a network address at which the at least one certificate of the third message is stored or is callable;
the second proxy generating a signature based on the date information, the copied piece of identification information, and the at least one fingerprint of the third message;
the second proxy including the generated signature within the header of the third message having the inserted piece of reference information for the at least one certificate of the second terminal to form a fourth message;
the second proxy sending the fourth message to the first terminal.

6. The method of claim 5, wherein the reference information for the at least one certificate of the third message is represented by a member of the group consisting of an Internet link and a universal resource identifier (URI) address.

7. The method of claim 1, wherein the first proxy is located in the first domain and the first terminal is located in the first domain.

8. The method of claim 1, wherein the reference information contains a reference identifying the at least one certificate as being located in a domain in which the first message is generated.

9. The method of claim 1, wherein the first terminal performs the copying of the piece of identification information and the inserting of the copied piece of identification information into the first message; and
wherein at least one of said first terminal and said second terminal is a terminal device, a gateway, or a server.

10. The method of claim 1, wherein the first terminal performs the copying of the piece of identification information and the inserting of the copied piece of identification information into the first message; and
wherein the first proxy is a computer device.

11. A system comprising:
a first terminal;
a first proxy assigned to the first terminal in a first domain, the first proxy being communicatively connected with the first terminal via a network;
the first terminal configured to create a first message for transmission to a second terminal, the first message having a header and a body, the first terminal configured to create the first message by:
deriving at least one fingerprint from at least one of a public key and a certificate of the first terminal,
inserting the at least one fingerprint into the body of the message to authenticate the at least one of the public key and the certificate, and
inserting a piece of identification information and a piece of date information into the header of the first message;
the first proxy configured to copy the piece of the identification information and insert the copied piece of the identification information into an additional field or element of the header of the first message;
the first proxy configured to enter a piece of reference information into the header of the first message;
the first proxy configured to generate a signature based on a hash value derived from the date information, signature information managed by the first proxy, the copied piece of identification information, and the at least one fingerprint;
the first proxy configured to insert the signature into the header of the first message; and
the first proxy configured to forward the first message toward a second proxy assigned to the second terminal in a second domain via the network, the forwarded first message having the signature inserted therein, having the copied piece of the identification inserted therein, and having the piece of reference information entered in the header of the first message.

12. The system of claim 11, wherein the signature is also based on the reference information.

13. The system of claim 11, wherein at least one additional piece of existing authentication-related information is included in the first message when generating the signature.

14. The system of claim 11, comprising:
the second terminal communicatively connected to at least one of the second proxy and the first terminal, the second terminal configured to receive the first message forwarded by the first proxy and respond to that first message by sending a second message.

15. The system of claim 14, further comprising:
the second proxy, the second proxy being communicatively connectable to the second terminal and at least one of the first terminal and the first proxy;
the second terminal configured to create the second message, the second message having a body and a header, the body of the second message having at least one fingerprint derived from at least one certificate of the second terminal that authenticates that at least one certificate, the header of the second message comprising a piece of identification information that identifies the second terminal and a piece of date information;
one of the second terminal and the second proxy configured to copy the piece of identification information of the second message and insert the copied piece of identification information of the second message into the second message;
the second proxy configured to receive the second message from the second terminal and insert a piece of reference information for the at least one certificate of the second terminal into the second message, the reference information of the second message indicating a network address at which the at least one certificate of the second terminal is stored or is callable;

the second proxy configured to generate a signature based on the date information, the copied piece of identification information, and the at least one fingerprint of the second message;

the second proxy configured to include the generated signature that was generated based on the date information, the copied piece of identification information, and the at least one fingerprint of the second message within the header of the second message having the inserted piece of reference information for the at least one certificate of the second message; and the second proxy configured to send the second message having the generated signature inserted therein, the copied piece of identification information of the second message inserted therein, and the piece of reference information inserted therein to the first terminal.

16. The system of claim 15, wherein the reference information inserted into the second message is a member of the group consisting of an Internet link and a universal resource identifier (URI) address.

17. The system of claim 11, wherein the first proxy is located in the first domain and the first terminal is located in the first domain.

18. The system of claim 11, wherein the reference information contains a reference identifying the at least one certificate as being located in a domain in which the first message is generated.

19. The system of claim 11,
wherein said first terminal is a terminal device, a gateway, or a server.

20. The system of claim 11, wherein
the first proxy is a server or a proxy server.

* * * * *